United States Patent [19]

Pruvot et al.

[11] 4,440,382

[45] Apr. 3, 1984

[54] VALVE WITH A DIRECT PASSAGE AND ROTARY CONTROL

[75] Inventors: Jean Pruvot, Noisy le Grand; André Roquefort, Clamart, both of France

[73] Assignee: Commissariat a l'Energie Atomique, Paris, France

[21] Appl. No.: 310,280

[22] Filed: Oct. 9, 1981

[30] Foreign Application Priority Data

Oct. 17, 1980 [FR] France ............................ 80 22263

[51] Int. Cl.³ ...................... F16K 31/44; F16K 25/00
[52] U.S. Cl. .................................. 251/248; 251/162; 251/192; 251/208
[58] Field of Search ............... 251/212, 208, 248, 162, 251/192

[56] References Cited

U.S. PATENT DOCUMENTS

| | | | |
|---|---|---|---|
| 1,742,828 | 1/1930 | Schmalz | 251/248 |
| 2,387,397 | 10/1945 | Hill | 251/248 |
| 3,742,979 | 7/1973 | Woodling | 251/192 |
| 3,880,402 | 4/1975 | Fleischer | 251/248 |
| 4,013,264 | 3/1977 | Friedell | 251/162 |

FOREIGN PATENT DOCUMENTS 1262734 4/1961 France .

*Primary Examiner*—A. Michael Chambers

*Attorney, Agent, or Firm*—Oblon, Fisher, Spivak, McClelland & Maier

[57] ABSTRACT

Valve with a direct passage and rotary control including a body sealed by a cover and both of which are provided with an orifice, and wherein the valve also includes two coaxial plates having in each case an orifice and positioned between the body and the cover, a ratchet mechanism interconnecting the plates under the action of elastic means when the valve is open, the four orifices then being aligned, a stop member integral with the cover, a lug integral with the first coaxial plate disposed in the vicinity of the bottom of the body and cooperating with an opening in the second plate close to the cover, an O-ring joint intended for sealing the orifice of the body when compressed by the first coaxial plate and a drive mechanism for rotating the two coaxial plates in such a way that, starting from the valve open position, the lug of the first coaxial plate abuts against the stop member, the second coaxial plate then rotating alone by a fraction of a turn, the first coaxial plae thus moving axially away from the second coaxial plate by disengagement of the ratchet mechanism to ensure the closure of the valve by means of the O-ring joint.

This type of valve can in particular be used for sealing locks, making it possible to place samples under a vacuum.

8 Claims, 7 Drawing Figures

VALVE WITH A DIRECT PASSAGE AND ROTARY CONTROL

BACKGROUND OF THE INVENTION

The present invention relates to a valve with a direct passage and rotary control. It applies inter alia, to placing pipes under vacuum and more particularly to the sealing of locks making it possible to place samples under a vacuum.

It is known that a conventional valve equipped with a slide valve has the major disadvantage for certain uses by having considerable lateral dimensions as a result of the valve control system.

BRIEF SUMMARY OF THE INVENTION

The present invention relates to a valve with a direct passage and rotary control making it possible to obviate this disadvantage.

This valve comprises a body sealed by a cover and both of these have an orifice, and wherein the valve also comprises two coaxial plates having in each case an orifice and positioned between the body and the cover, a ratchet mechanism interconnecting the plates under the action of elastic means when the valve is open, the four orifices then being aligned, a stop member integral with the cover, a lug integral with the first coaxial plate disposed in the vicinity of the bottom of the body and cooperating with an opening in the second plate close to the cover, an O-ring joint intended for sealing the orifice of the body when compressed by the first coaxial plate and a drive mechanism for rotating the two coaxial plates in such a way that, starting from the valve open position, the lug of the first coaxial plate abuts against the stop member, the second coaxial plate then rotating alone by a fraction of a turn, the first coaxial plate thus moving axially away from the second coaxial plate by disengagement of the ratchet mechanism to ensure the closure of the valve by means of the O-ring joint.

According to a special feature of the invention, the ratchet mechanism comprises balls cooperating with indentations and disposed in recesses, respectively, made in the first and second plates, and the elastic means being a spring. During disengagement of the ratchet mechanism, the balls remain in the recesses made in the second plate, but are dislodged from the indentations, which are for example conical formed in the first plate, thus moving the first plate away from the second plate bringing about the closing of the valve according to the invention. During the opening of the latter (corresponding to the rotation of the plates in the opposite direction) the balls reassume their position in the indentations in the first plate. If the second plate had indentations instead of recesses, the balls would not necessarily return into the said indentations during the opening of the valve according to the invention and might instead pass through the various orifices therein.

Obviously, the ball could be replaced by studs in the said recesses, but these studs would be subject to rapid wear and would require greater forces than the balls on the part of the drive mechanism.

According to a preferred embodiment of the invention, the drive mechanism comprises a motor driving a pinion, which itself drives the second plate which is toothed.

Preferably, the motor is placed on the cover. Thus, the drive mechanism (controlling the opening and closing of the valve according to the invention) does not cause any increase in lateral dimension of the valve and occupies a minimum volume for a given size of said orifices.

According to another feature, the balancing means, for the forces exerted on the first plate by the O-ring joint sealing the orifice of the valve body when the latter is closed, are placed on the bottom of the valve body. These balancing means may, for example, comprise two abutments integral with the bottom of the body and positioned so as to define the base of an isosceles triangle, whose "apex" is the O-ring joint sealing the orifice of the valve body, but preferably the joint and the balancing means are O-rings. Thus, the joint sealing the valve body orifice when worn can be replaced by the second O-ring kept in reserve.

In addition, a regulating device can be placed on the valve cover to optimize the compression of the O-rings. It comprises, for example, a rigid shim or a regulatable screw system having the same axis as the two plates and making it possible to obviate having excessively close tolerances in the manufacture of the valve according to the invention, whilst exerting an adequate engagement force on the plates.

BRIEF DESCRIPTION OF THE DRAWINGS

The invention is described in greater detail hereinafter relative to non-limitative embodiments and with reference to the attached drawings, wherein:

FIG. 3b is a plan view of the valve without a cover and in the same position as in FIG. 3a.

DETAILED DESCRIPTION OF THE PREFERRED EMBODIMENTS

Figure 1:
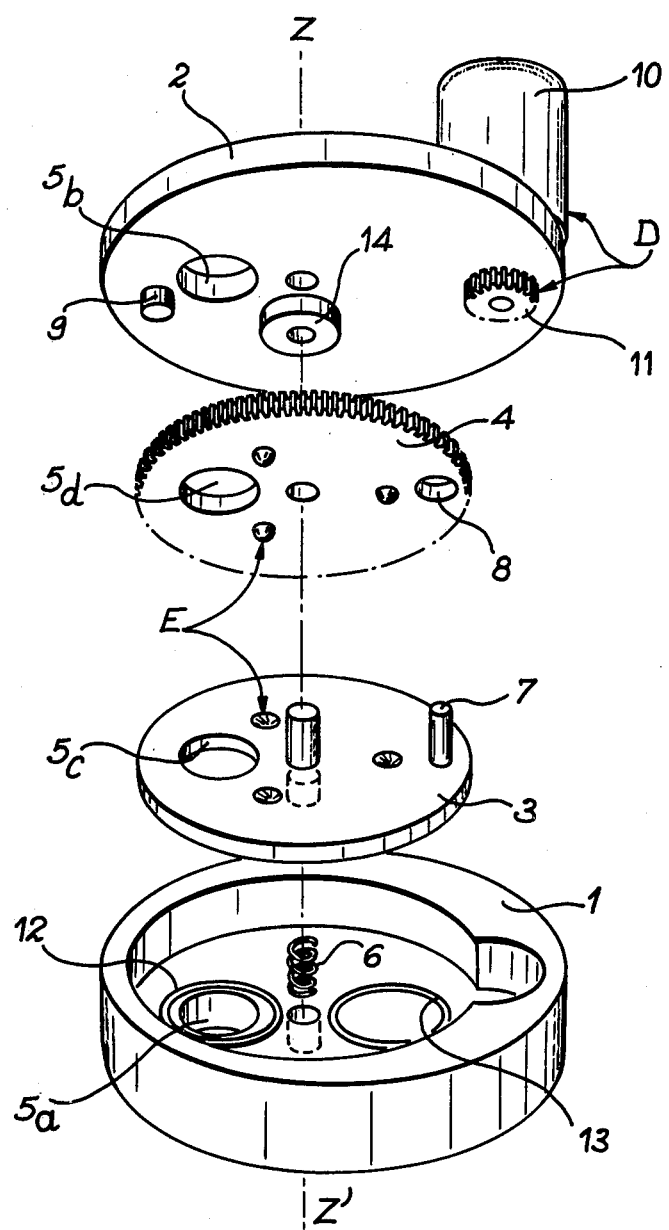
FIG. 1 is an exploded view of the valve according to the invention.

FIG. 1 shows the essential components of the valve according to the invention. The latter comprises body 1 and cover 2. Body 1 has an orifice 5a and cover 2 an orifice 5b. Two plates of the same axis Z'Z are placed between body 1 and cover 2. The first plate 3 is disposed close to the bottom of body 1 and has an orifice 5c. The second plate 4 is close to cover 2 and has an orifice 5d.

The ratchet mechanism E makes it possible to interconnect plates 3 and 4 under the action of elastic means 6 consisting of a spring which bears on the base of body 1. Lug 7, integral with the first plate 3 and traversing an opening 8 made in the second plate 4, abuts against the stop member 9 integral with cover 2 when plates 3 and 4 are moved by the drive mechanism D incorporating motor 10 placed on cover 2. Motor 10 drives pinion 11, which itself drives the second toothed plate 4. Motor 10 may also be placed on body 1. Obviously, the motor 10 could be placed at a distance from the valve according to the invention, the mechanical connection between the valve and the motor being provided by a transmission shaft.

Balancing means 13, for forces exerted by O-ring 12 on the first plate 3 when the valve according to the invention is closed, are placed on the base of the member 1 symmetrically to O-ring joint 12 with respect to axis Z'Z and comprises a second O-ring. O-ring 12 serves to seal orifice 5a of body 1.

In order to optimize the compression of these two O-rings 12, 13, a regulating device 14 is placed on cover 2. This regulating device 14 must be rigid and comprises, for example, a rigid shim or a regulatable screw system.

Figure 2A:
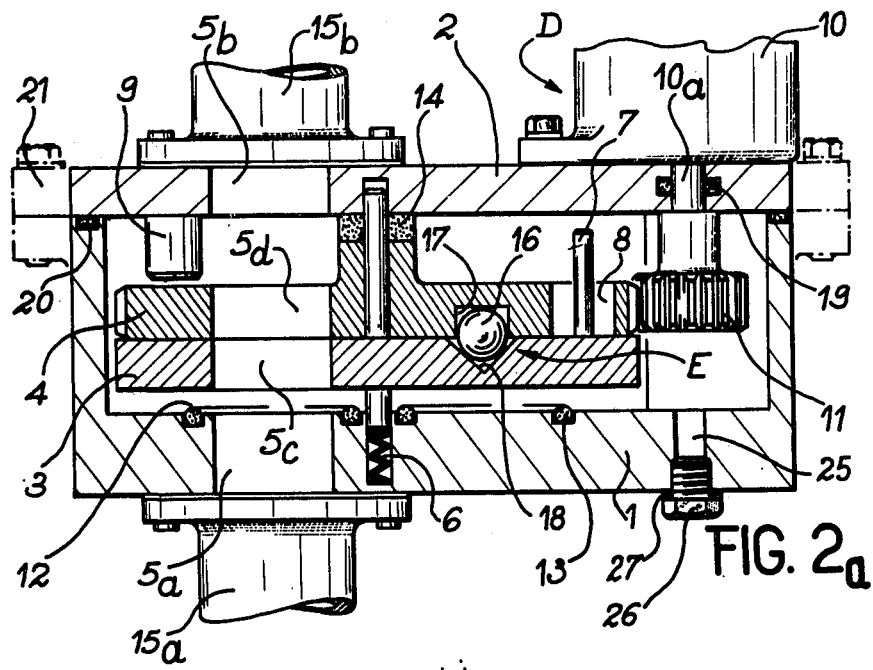
FIG. 2a is a sectional view of the valve in the open position.
Figure 2B:
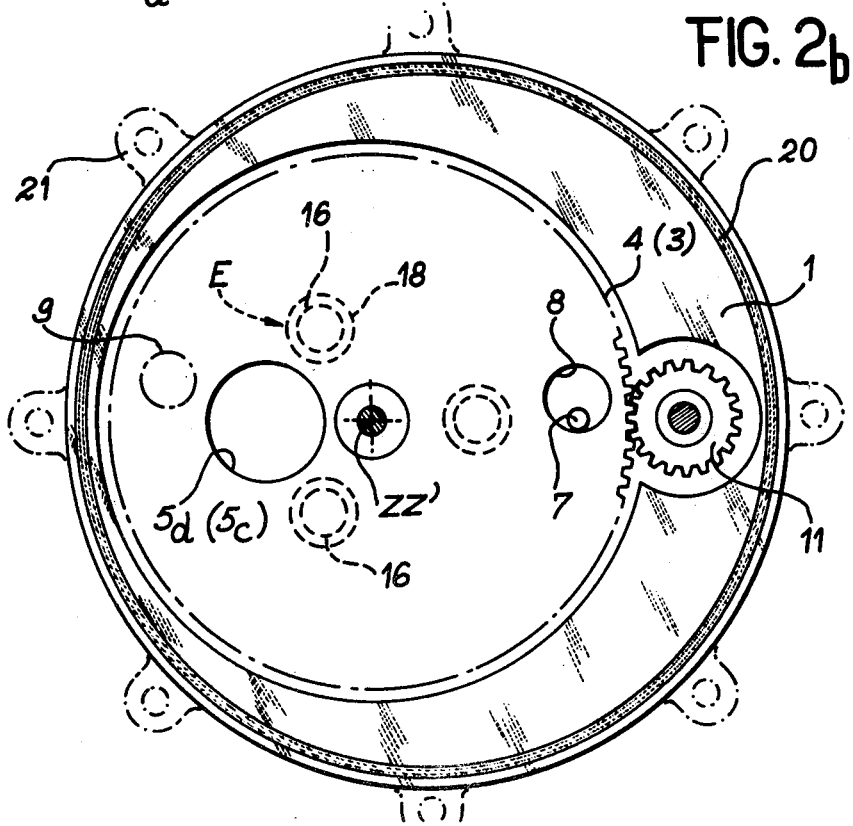
FIG. 2b is a plan view of the valve in the open position, with its cover removed.

FIGS. 2a and 2b show the valve according to the invention in the open position, the first in a sectional view and the second in a plan view, with cover 2 removed.

In the open position, the four orifices 5a, 5b, 5c and 5d are aligned. When it is desired to form a vacuum in an enclosure, the valve according to the invention is preferably mounted in such a way that the orifice 5a of body 1 issues into the pipe 15a leading to the enclosure to be placed under vacuum and orifice 5b of cover 2 issues into pipe 15b leading to the vacuum pumping device (not shown) and which does not form part of the invention.

Plates 3 and 4 are rendered integral under the action of spring 6 by the ratchet mechanism E, which comprises balls 16 located in recesses 17 of the second plate 4 and indentations 18 of the first plate 3.

There are three balls 16 and they are arranged (in the same way as recesses 17 and indentations 18) so as to occupy the apices of an equilateral triangle, whose centre of gravity is located on axis Z'Z. According to an improved embodiment, the valve according to the invention could have the same number of balls 16 as there are O-rings 12 and 13. For example, in place of an O-ring 13, the valve according to the invention could have two O-rings disposed in the same way as O-ring 12 at the apices of an equilateral triangle, whose centre of gravity is located on axis Z'Z.

A gasket 19 is placed on shaft 10a of motor 10. In the same way, a gasket 20 seals the connection between body 1 and cover 2 produced by clips 21. An orifice 25 sealed by a screw 26 provided with a gasket 27 is made in body 1 facing motor 10. It can be used for producing an initial vacuum.

Figure 3A:
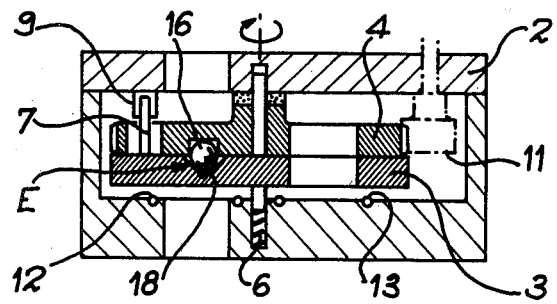
FIG. 3a is a sectional view of the same valve during closing when the lug has just abuted against the stop member.
Figure 3B:
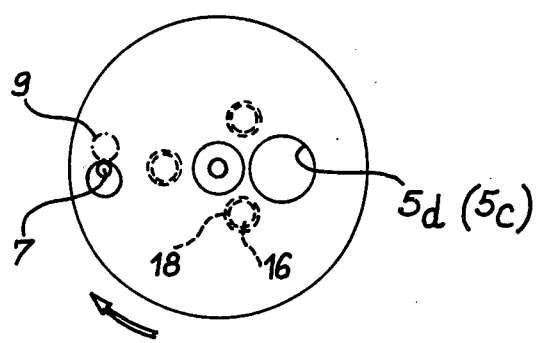

Motor 10 rotates plates 3 and 4 via pinion 11. As indicated in FIGS. 3 and 4 showing the valve during closure, at the end of its travel lug 7 of the first plate 3 abuts against stop member 9 integral with cover 2. FIG. 3a shows the first plate in a sectional view and FIG. 3b in a plan view with cover 2 removed.

Figure 4A:
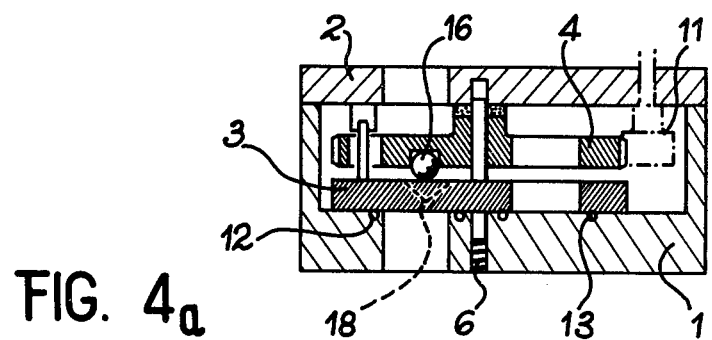
FIG. 4a is a sectional view of the valve in the closed position.
Figure 4B:
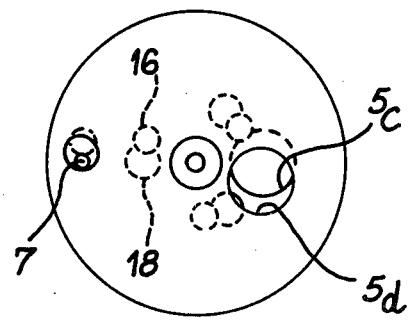
FIG. 4b is a plan view of the valve without the cover and in the closed position.

The second plate 4 alone continues to rotate by a fraction of a turn, which has the effect of dislodging balls 16 from indentations 18 of the first plate 3, as indicated in FIGS. 4a and 4b. FIG. 4a shows the valve according to the invention in the closed position in a sectional view and FIG. 4b shows it in plan view with cover 2 removed. Under the action of balls 16, the first plate 3 moves away from the second plate 4 towards the base of body 1 and compresses O-rings 12 and 13.

Starting with the valve according to the invention in the closed position (FIGS. 4a and 4b) it can be brought into the open position under the action of pinion 11. The second plate 4 is rotated by a fraction of a turn, whilst the first plate 3 is immobilized by the frictional force of O-rings 12 and 13. Ratchet mechanism E then locks (FIGS. 3a and 3b), which frees the first plate 3, thus permitting the decompression of O-rings 12 and 13. Under the action of spring 6, plates 3 and 4 are maintained towards cover 2 and disengaged from contact with O-rings 12 and 13. Plates 3 and 4, again rendered integral by ratchet mechanism E are rotated until all the orifices 5a, 5b, 5c and 5d are in alignment (FIGS. 2a and 2b).

The valve with direct passage and rotary control according to the invention makes it possible to ensure the conventional sealing functions under a vacuum. However, it is obviously possible to use it with any fluid and namely either a liquid or a gas.

The drive mechanism controlling valve opening and closing with a motor placed on the valve cover occupies a minimum volume for a given size of the fluid passage orifices and leads to no increase in lateral dimension of the valve body.

This type of valve, which can be miniaturized and remotely controlled, can in particular be used for the sealing of locks, so that samples can be placed under a vacuum.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A valve having a direct passage and rotary control, comprising:

a body including an orifice therethrough;

a cover adapted to sealingly engage said body and including an orifice therethrough and positioned such that when said cover is sealingly engaged with said body said orifice of said cover is axially aligned with said orifice of said body;

a first plate rotatably disposed in said body near a bottom of said body and including an orifice therethrough such that when said valve is in a valve open position for a fluid flow therethrough said orifice of said first plate is axially aligned with said orifice of said body, and when said valve is in a valve closed position said orifice of said first plate is out of alignment with said orifice of said body and said fluid flow is precluded frrom passing through said valve;

a lug integral with said first plate;

a second plate rotatably disposed between said first plate and said cover and including an orifice and a lug hole therethrough, said lug hole adapted to receive said lug therein to align said orifice of said second plate with said orifice of said first plate and wherein said first plate and said second plate are rotatably disposed about a longitudinal axis of said valve;

drive means operatively associated with said second plate for alternately rotating said second plate to said valve open position and said valve closed position, said drive means including a motor having a rotational axis parallel to said longitudinal axis and wherein said motor has a lateral dimension such that any peripheral edge of said motor does not extend beyond any peripheral edge of said valve;

a stop member integral with said cover and positioned such that said lug abuts against said stop member when said valve is in said valve closed position;

a ratchet mechanism operatively associated with said first plate and said second plate and disposed therebetween such that when said drive means alternately rotates said second plate to said valve open position and said valve closed position said ratchet mechanism is constructed so as to be operative to engage said first plate with said second plate during rotation thereof, and when said lug abuts against said stop member said ratchet mechanism is constructed so as to be operative to axially displace said first plate against said bottom of said body; and a sealing joint disposed about said orifice of said body such that when said first plate is axially displaced by said ratchet mechanism said sealing joint is compressed in a sealtight manner about said orifice of said body by said first plate and said fluid flow through said orifice of said body is precluded.

2. The valve as claimed in claim 1 further comprising elastic means disposed between said bottom of said body and said first plate, and wherein said ratchet mechanism comprises a plurality of balls, said first plate including a plurality of indentations formed in a surface of said first plate adjacent said second plate and said second plate including a plurality of recesses formed in a surface of said second plate adjacent said first plate such that each said plurality of balls is disposed in a corresponding one of said plurality of recesses and received in a corresponding one of said plurality of indentations to engage said first plate with said second plate during alternate rotation of said second plate to said valve open position and said valve closed position.

3. The valve as claimed in claim 1 wherein said second plate further includes teeth formed in a radial edge thereof and wherein said drive means includes a pinion operatively associated with said motor and said teeth of said second plate such that said motor rotates said pinion to rotate said second plate.

4. The valve as claimed in claim 1 wherein said motor is disposed on said cover.

5. The valve as claimed in claim 1 further comprising balancing means disposed in said bottom of said body for balancing forces exerted against said first plate by said sealing joint when said sealing joint is compressed by said first plate.

6. The valve as claimed in claim 5 wherein said balancing means and said sealing joint are O-rings.

7. The valve as claimed in claim 6 further comprising a regulating device adapted to regulate compression of said O-rings by said first plate.

8. The valve as claimed in claim 6 wherein said balancing means further comprises two O-rings and wherein said plurality of balls is three and wherein said balls and said O-rings are disposed, respectively, at apices of two equilateral triangles, each of said two equilateral triangles having a center of gravity coincident with said longitudinal axis.

* * * * *